United States Patent
Deperro

(10) Patent No.: US 10,837,481 B2
(45) Date of Patent: Nov. 17, 2020

(54) FLUSH MOUNT RETAINER ASSEMBLY

(71) Applicant: A. Raymond et Cie, Grenoble (FR)

(72) Inventor: Charles A. Deperro, Royal Oak, MI (US)

(73) Assignee: A. Raymond et Cie, Grenoble (FR)

( * ) Notice: Subject to any disclaimer, the term of this patent is extended or adjusted under 35 U.S.C. 154(b) by 322 days.

(21) Appl. No.: 15/902,458

(22) Filed: Feb. 22, 2018

(65) Prior Publication Data

US 2019/0257339 A1  Aug. 22, 2019

(51) Int. Cl.
| | | |
|---|---|---|
| *F16B 13/06* | (2006.01) | |
| *F16B 13/08* | (2006.01) | |
| *F16B 13/12* | (2006.01) | |
| *F16B 37/02* | (2006.01) | |
| *F16B 37/04* | (2006.01) | |
| *F16B 13/10* | (2006.01) | |
| *F16B 21/08* | (2006.01) | |
| *F16B 5/06* | (2006.01) | |

(52) U.S. Cl.
CPC .......... *F16B 13/08* (2013.01); *F16B 13/124* (2013.01); *F16B 37/02* (2013.01); *F16B 37/041* (2013.01); *F16B 5/065* (2013.01); *F16B 21/086* (2013.01); *F16B 37/043* (2013.01); *F16B 2013/10* (2013.01)

(58) Field of Classification Search
CPC .............................. F16B 37/02; F16B 37/043
USPC ........................... 411/175, 176; 24/293, 295
See application file for complete search history.

(56) References Cited

U.S. PATENT DOCUMENTS

| | | | |
|---|---|---|---|
| 2,571,394 A | 10/1951 | Trafton | |
| 4,300,865 A * | 11/1981 | Murray | F16B 37/043 411/15 |
| 4,595,325 A | 6/1986 | Moran et al. | |

(Continued)

FOREIGN PATENT DOCUMENTS

| | | |
|---|---|---|
| CN | 103591110 A | 2/2014 |
| CN | 203641234 U | 6/2014 |

(Continued)

OTHER PUBLICATIONS

Machine assisted English translation of JP2001234988A obtained from https://patents.google.com on Sep. 5, 2019, 7 pages.

(Continued)

*Primary Examiner* — Gary W Estremsky

(74) *Attorney, Agent, or Firm* — Warner Norcross + Judd LLP

(57) ABSTRACT

A flush mount retainer assembly adapted to be received within a panel opening is provided. The flush mount retainer assembly includes a base defining a threaded bore for receiving a fastener and a front and back support members that each resiliently flex outwardly in response to the fastener engaging the threaded bore. Front and back retention members extend from the front and back support members, respectively, to limit movement of the flush mount retainer assembly relative to the panel prior to the bore being engaged by the fastener. The flush mount retainer assembly further includes first and second-side retention members disposed between vertical portions of the front and back support member and being adapted to stabilized the flush mount retainer assembly within panel openings having certain depths.

20 Claims, 8 Drawing Sheets

(56) References Cited

U.S. PATENT DOCUMENTS

| | | |
|---|---|---|
| 4,865,505 A | 9/1989 | Okada |
| 4,925,351 A * | 5/1990 | Fisher ................. F16B 37/043 |
| | | 411/182 |
| 5,249,900 A | 10/1993 | Mitts |
| 5,533,237 A | 7/1996 | Higgins |
| 5,873,690 A | 2/1999 | Danby et al. |
| 6,164,885 A | 12/2000 | Roytberg et al. |
| 6,280,129 B1 | 8/2001 | Lowry et al. |
| 6,409,443 B1 | 6/2002 | Lowry et al. |
| 6,524,044 B1 | 2/2003 | Vassiliou |
| 6,606,766 B2 | 8/2003 | Ko |
| 6,726,418 B2 | 4/2004 | Dickinson et al. |
| 6,896,461 B2 | 5/2005 | Fleydervish et al. |
| 6,899,499 B2 | 5/2005 | Dickinson et al. |
| 6,908,274 B1 | 6/2005 | Vassiliou |
| 7,086,125 B2 | 8/2006 | Slobodecki et al. |
| 7,226,260 B2 | 6/2007 | Jackson, Jr. et al. |
| 7,428,770 B2 | 9/2008 | Dickenson et al. |
| 7,568,870 B2 | 8/2009 | Paquet |
| 7,572,089 B2 * | 8/2009 | Lowry ................... F16B 37/02 |
| | | 411/182 |
| 7,640,635 B2 | 1/2010 | Kim et al. |
| 8,240,964 B2 | 8/2012 | Motsch et al. |
| 8,753,055 B2 | 6/2014 | Ruckel |
| 8,832,907 B2 | 9/2014 | De Jong et al. |
| 9,009,928 B2 | 4/2015 | Binkert |
| 9,156,414 B2 | 10/2015 | Diez Herrera |
| 9,440,596 B2 * | 9/2016 | Huelke ................... B60N 3/026 |
| 9,562,554 B2 | 2/2017 | Vidal et al. |
| 9,631,662 B2 | 4/2017 | Boyer et al. |
| 9,695,850 B2 | 7/2017 | Hirakawa et al. |
| 2002/0054808 A1 | 5/2002 | Vassiliou |
| 2004/0049894 A1 | 3/2004 | Jackson, Jr. et al. |
| 2004/0244156 A1 | 12/2004 | Jackson, Jr. et al. |
| 2005/0117993 A1 | 6/2005 | Vassiliou |
| 2005/0271492 A1 | 12/2005 | Jackson, Jr. et al. |
| 2008/0260490 A1 | 10/2008 | Motsch et al. |
| 2008/0286066 A1 | 11/2008 | Paquet |
| 2015/0107060 A1 * | 4/2015 | Ortega Dona ...... F16B 19/1081 |
| | | 24/295 |
| 2015/0267734 A1 | 9/2015 | Boyer et al. |
| 2016/0144801 A1 | 5/2016 | Huelke et al. |
| 2016/0208839 A1 | 7/2016 | Vidal et al. |
| 2017/0254350 A1 | 9/2017 | Schulz et al. |

FOREIGN PATENT DOCUMENTS

| | | |
|---|---|---|
| DE | 1923321 A1 | 11/1969 |
| DE | 20319556 U1 | 3/2004 |
| EP | 0588467 A1 | 3/1994 |
| EP | 0931946 A1 | 7/1999 |
| EP | 1963689 B1 | 9/2008 |
| EP | 1977121 B1 | 10/2008 |
| GB | 1217382 A | 12/1970 |
| JP | 2001234988 A | 8/2001 |
| WO | 2016114999 A1 | 7/2016 |

OTHER PUBLICATIONS

English language abstract and machine translation for DE20319556 (U1) extracted from http://worldwide.espacenet.com database on Mar. 22, 2018, 7 pages.

English language abstract and machine translation for CN103591110 (A) extracted from http://worldwide.espacenet.com database on Mar. 22, 2018, 9 pages.

English language abstract and machine translation for CN203641234 (U) extracted from http://worldwide.espacenet.com database on Mar. 22, 2018, 9 pages.

* cited by examiner

FLUSH MOUNT RETAINER ASSEMBLY

FIELD OF THE INVENTION

The present disclosure generally relates to a flush mount retainer assembly and, more specifically, to a flush mount retainer assembly for securing a component to a panel defining one or more panel openings.

BACKGROUND OF THE INVENTION

Retainer assemblies, also termed bracket retainer nuts, are used in various industries to secure one or more components to a panel. In the automotive industry, for example, a retainer assembly may be used to secure a door trip panel to a metal sheet panel for a vehicle door.

Retainer assemblies typically include a base, a nut extending from the base, and one or more support members extending from the base. In use, a retainer assembly is inserted by hand into a panel opening defined by a panel, and a bolt or other fastener is inserted into the nut. The support members expand or flex outwardly behind the panel opening in response to engagement of the bolt with the nut, thereby securing the retainer assembly to the panel opening.

In one conventional retainer assembly, the support members include front and back support members each having a vertical portion that is connected to the base and a horizontal portion that extends from the vertical portion and partially overlies the nut. A front retention member slopes outwardly from the front support member and a back retention member slopes outwardly from the back support member. The front and back retention members are oversized with respect to the panel opening to prevent the retainer assembly from backing out of the panel opening.

Despite the advantages of the foregoing retainer assembly, this conventional retainer assembly is susceptible to movement, e.g. slop or sag, after insertion into the panel opening but prior to engagement of the nut by the bolt. This is particularly problematic when this conventional retainer assembly is used with relatively thin panels, and when the retainer assembly is subjected to external forces such as gravity causing the assembly to hang from a panel, vibrations, or the pressing of objects against the retainer assembly. In practice, this limits the applications for which this conventional retainer assembly may be utilized.

Accordingly, there exists a continued need for an improved retainer assembly that can accommodate panels of various thicknesses. In particular, there remains a continued need for an improved retainer assembly that can remain seated within an opening in panels of various thicknesses while withstanding vibrations and other external forces.

SUMMARY OF THE INVENTION

The present disclosure provides a flush mount retainer assembly. The flush mount retainer assembly generally includes a base, a cylinder extending from the base and defining a threaded bore, and a support member extending from the base. The support member includes a horizontal portion overlying the threaded bore, and the support member further includes a front retention member disposed at a front side thereof and a back retention member disposed at a back side thereof. The front retention member and the back retention member are spaced apart from the base by a first distance. The assembly further includes a first-side retention member and a second-side retention member disposed at opposing lateral sides of the flush mount retainer assembly. The first-side retention member and the second-side retention member are adapted to stabilize the flush mount retainer assembly within a panel opening having a depth less than the first distance.

In one embodiment, the flush mount retainer assembly includes a base, a cylinder defining a threaded bore, a front support member having a front retention member, a back support member having a back retention member, a first-side retention member, and a second-side retention member. The front retention member extends from the front support member and the back retention member extends from the back support member. In general, the front and back retention members are configured to at least partially limit movement of the flush mount retainer assembly relative to the panel prior to the threaded bore being engaged by a fastener. The first-side retention member is disposed between a vertical portion of the front support member and a vertical portion of the back support member to establish an interference fit with a first side edge of the panel opening, and a second-side retention member is disposed between the vertical portion of the front support member and the vertical portion of the back support member to establish an interference fit with a second side edge of the panel opening.

Each of the first and second-side retention members (collectively "the side retention members) generally include an angled portion that flares outwardly toward the base to engage a side edge of the panel opening. In one embodiment, the side retention members extend generally downward from a horizontal portion of the front support member. In another embodiment, the side retention members extend generally downward from a horizontal portion of the back support member. In still another embodiment, portions of the side retention members extend generally upward from opposing sides of the base. In yet another embodiment, the side retention members extend in a generally downward angled manner from a vertical portion of the front support and/or back support members.

As described further below, the side retention members establish an interference fit with the panel opening, such that the base of the flush mount retainer assembly remains flush with the panel. For panels having a thickness less than a second distance separating the side retention members from the base, the side retention members protrude over the panel to obstruct withdrawal of the flush mount retainer assembly from the panel opening. The present disclosure facilitates the manufacture of flush mount retainer assemblies having a greater breadth of dimensional flexibility than those that include only front and back retention members by eliminating certain dimensional constraints, e.g. those that would be imposed on front and back faces of the flush mount retainer assembly for the side retention members to function properly.

These and other features and advantages of the present disclosure will become apparent from the following description of particular embodiments, when viewed in accordance with the accompanying drawings and appended claims.

DETAILED DESCRIPTION OF THE CURRENT EMBODIMENTS

Figure 1:
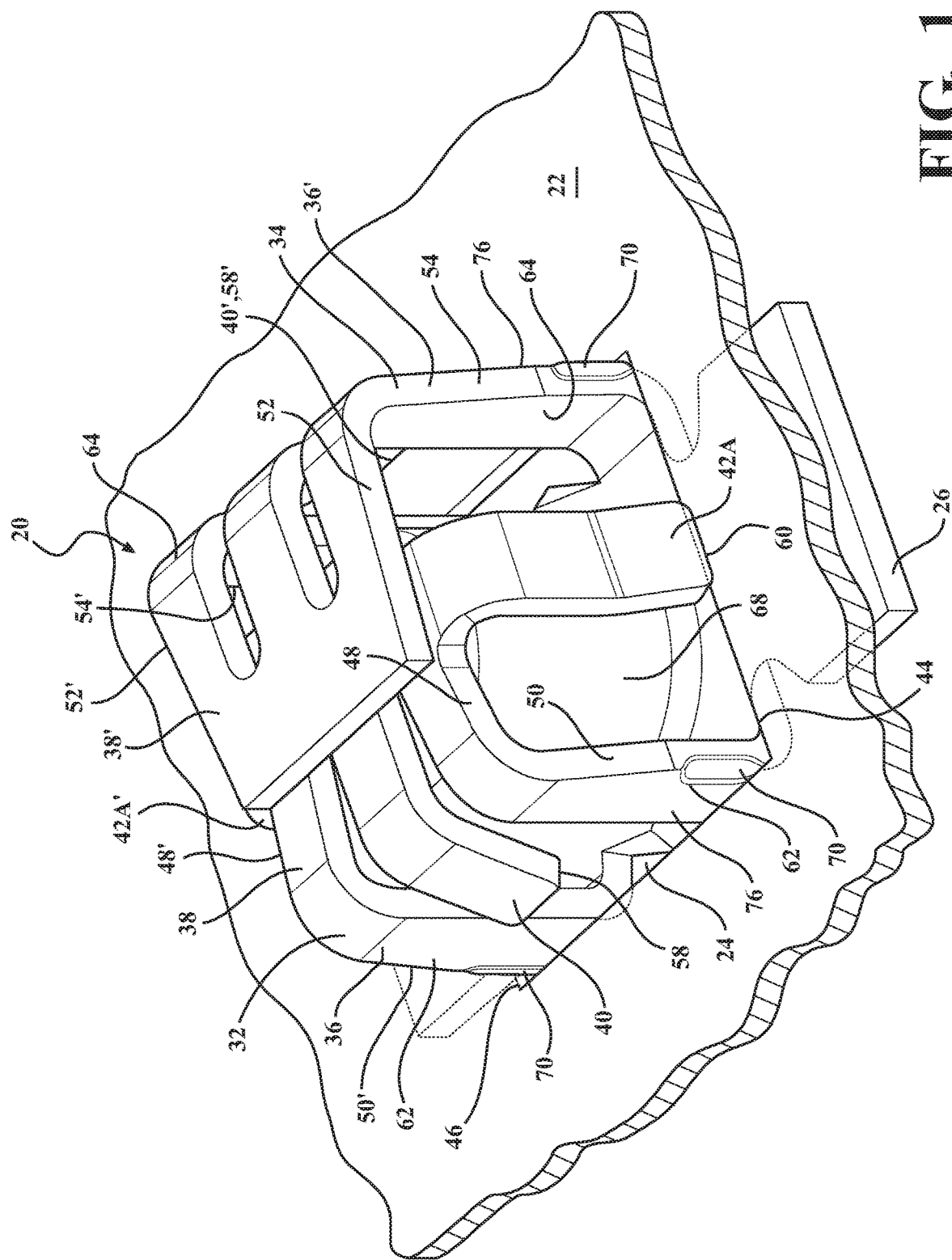
FIG. 1 is a perspective view of a flush mount retainer assembly in accordance with a first embodiment of the present disclosure received within a panel opening defined by a panel.
Figure 2:
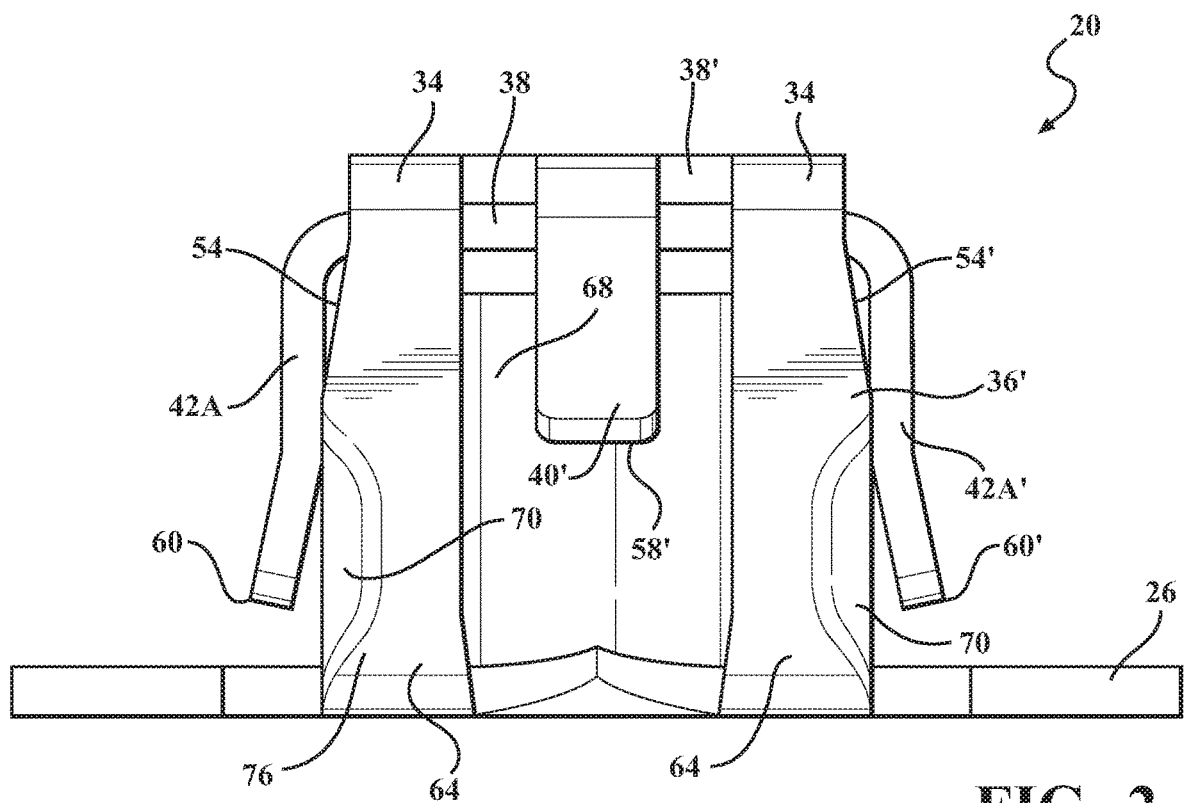
FIG. 2 is a back elevation view of the flush mount retainer assembly of FIG. 1.
Figure 3:
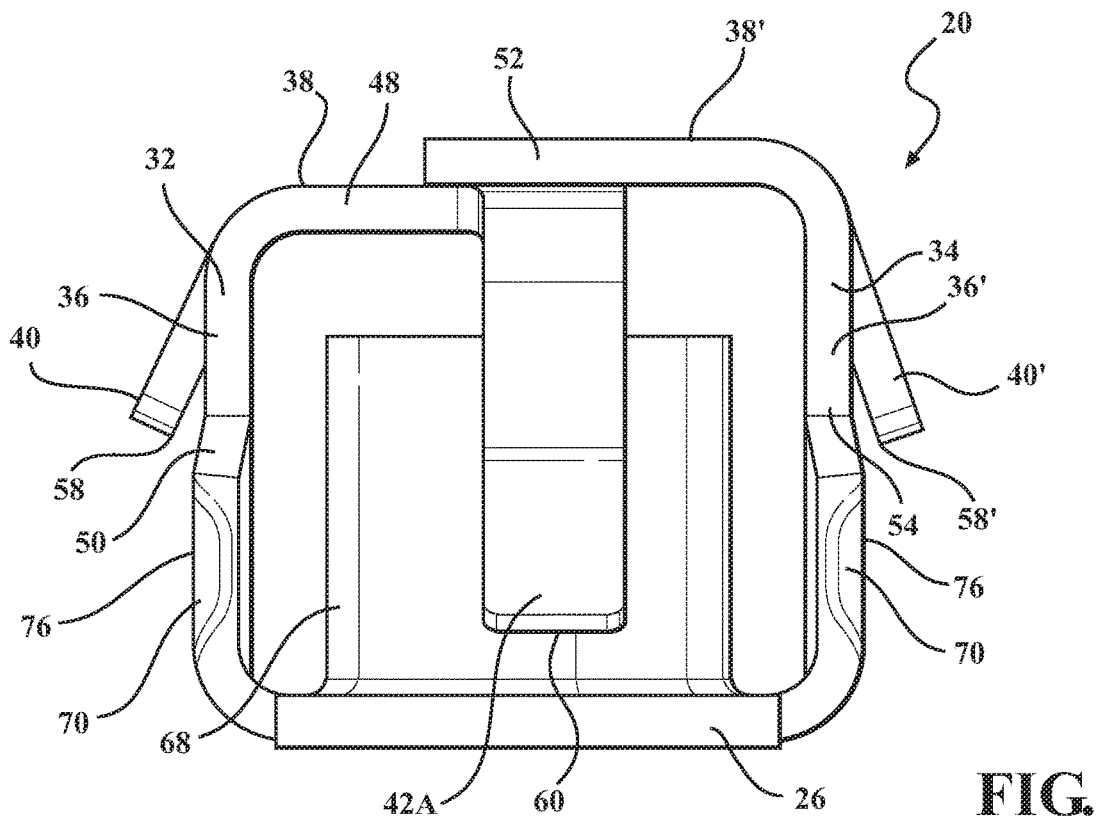
FIG. 3 is a side elevation view of the flush mount retainer assembly of FIG. 1.
Figure 4:
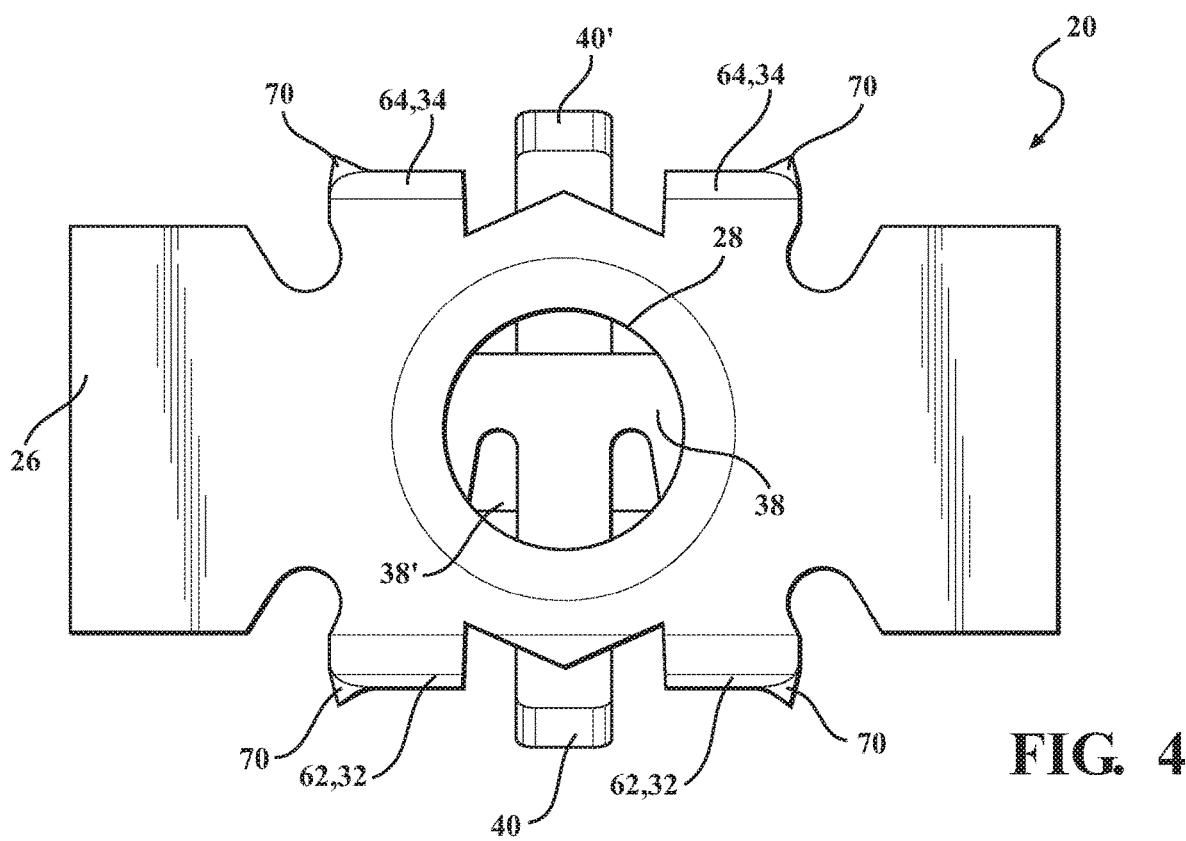
FIG. 4 is a bottom plan view of the flush mount retainer assembly of FIG. 1.

Referring to FIGS. 1-8, wherein like numerals indicate corresponding parts throughout the several views, a flush mount retainer assembly is illustrated and generally designated 20. Certain features of the flush mount retainer assembly 20 are functional, but can be implemented in different aesthetic configurations. The flush mount retainer assembly 20 is received within a panel opening 24 defined by a panel 22 for securing a component 74 to the panel 22. The flush mount retainer assembly 20 generally includes a base 26, a threaded bore 28 for receiving a fastener 30, and a support member (32, 34).

In certain embodiments, the support member includes front and back support members 32, 34 that extend from the base 26 and that include front and back retention members 40, 40'. The flush mount retainer assembly 20 additionally includes first and second-side retention members 42A, 42A' for stabilizing the flush mount retainer assembly 20 in panel openings 24 of minimal depth (e.g. those defined by a panel 22 having a minimal thickness). Accordingly, the flush mount retainer assembly 20 may be utilized with panels 22 of various thicknesses and that define panel openings 22 of various depths.

Figure 7:
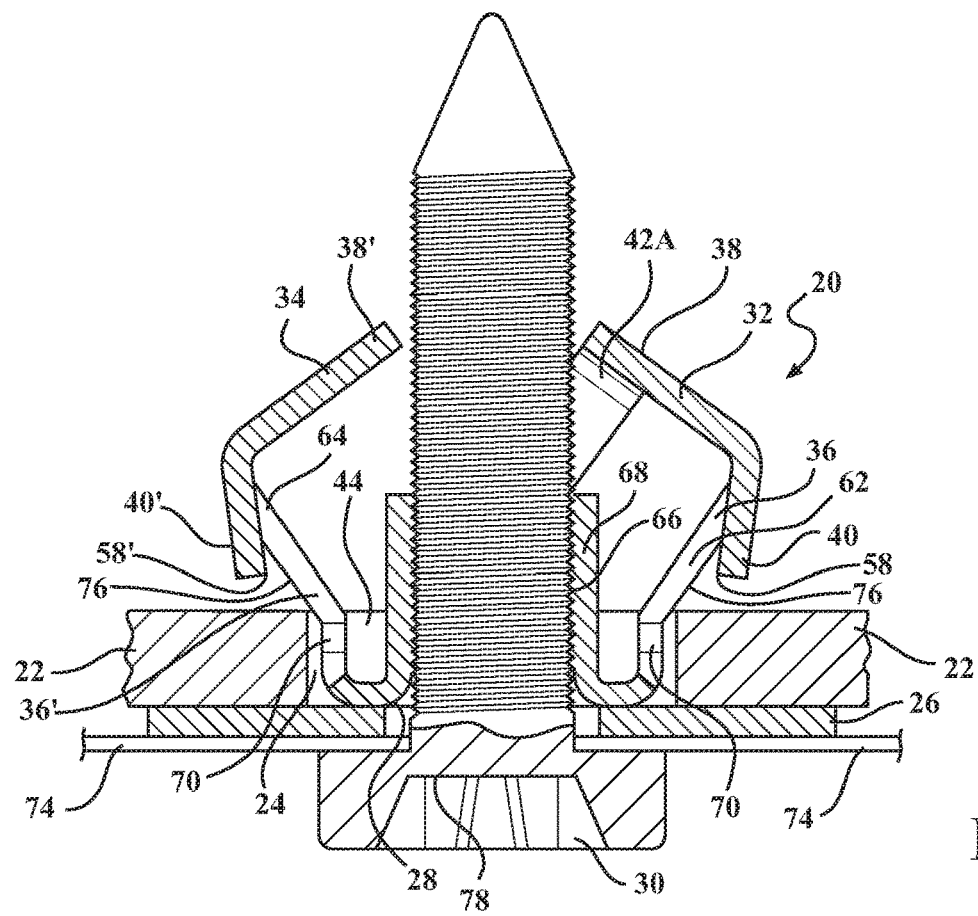
FIG. 7 is a cross-sectional view of the flush mount retainer assembly of FIG. 1 received within a panel opening after being engaged by a fastener.

More specifically, the front and back support members 32, 34 include vertical portions 36, 36' connected to the base 26, and horizontal portion 38, 38' extending from the vertical portions 36, 36' and at least partially overlying the threaded bore 28. The front and back support members 32, 34 are resiliently flexible so as to flex outwardly in response to the threaded bore 28 being engaged by the fastener 30, as best shown in FIG. 7. Accordingly, the support members 32, 34 are typically manufactured of a suitably resilient material, for example a plastic or metal, e.g. steel. However, in certain embodiments, only a portion of the front and back support members 32, 34 is made of a resiliently flexible material, e.g. only at the interface between the base 26 and the vertical portions 36, 36'. The outward flexing of the front and back support members 32, 34 is effected by the alignment of at least a portion of the horizontal portions 38, 38' over the threaded bore 28. This alignment over the threaded bore 28 implies a portion of the horizontal portion 38 of the front support member 32 underlaps (that is, is more proximal to the base 26 than an overlapping region of) at least a portion of the horizontal portion 38' of the back support member 34. In this fashion, when the fastener 30 is engaged with the threaded bore 28 and driven against the overlapping regions of the front and back support members 32, 34, the front and back support members 32, 34 flex away from one another and into and/or over the panel 22, thereby fixing the flush mount retainer assembly 20 within the panel opening 24.

Figure 5:
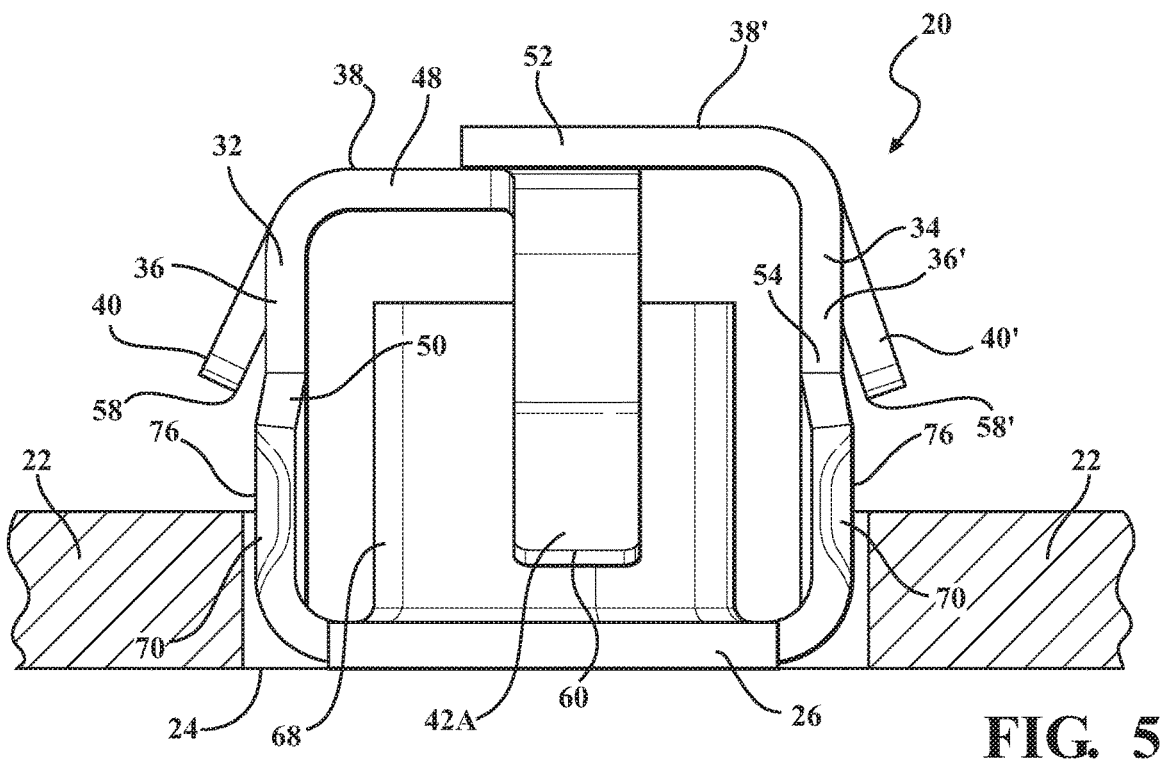
FIG. 5 is a side elevation view of the flush mount retainer assembly of FIG. 1 received within a panel opening defined by a panel prior to being engaged by a fastener.

As noted above, the flush mount retainer assembly 20 includes front and back retention members 40, 40'. The front retention member 40 extends from the front support member 32 and the back retention member 40' extends from the back support member 34. The front and back retention members 40, 40' are also resiliently flexible and include a terminal end 58, 58' that slopes outwardly and that is spaced apart from the base 26 by a first distance. The front and back retention members 40, 40' limit movement of the flush mount retainer assembly 20 relative to the panel 22 upon insertion of the flush mount retainer assembly 20 into the panel opening 24 and prior to the fastener 30 being engaged with (e.g. driven through) the threaded bore 28, as shown in FIG. 5. During insertion of the flush mount retainer assembly 20 into the panel opening 24, upon application of a relatively small insertion force, the front and back retention members 40, 40' flex inwardly, and flex back outwardly to their original positions once the flush mount retainer assembly 20 is inserted into the panel opening 24. Though not shown, the flush mount retainer assembly 20 can include multiple front and back retention members (e.g. in addition to front and back retention members 40, 40'), which may independently extend from horizontal and/or vertical portions of the front and back support members 32, 34.

As noted above, the flush mount retainer assembly 20 further includes the first and second-side retention members 42A, 42A' (collectively, "the side retention members"). The first-side retention member 42A is disposed between the vertical portion 36 of the front support member 32 and the vertical portion 36' of the back support member 34 to establish an interference fit with a first edge 44 of the panel opening 24, as shown most clearly in FIG. 6. Likewise, the second-side retention member 42A' is disposed between the vertical portion 36 of the front support member 32 and the vertical portion 36' of the back support member 34 to establish an interference fit with a second edge 46 of the panel opening 24.

The side retention members 42A, 42A' are resiliently flexible and include terminal ends 60, 60' that slope outwardly and are spaced apart from the base 26 by a second distance. As shown in FIG. 5, the second distance separating the base 26 from the terminal ends 60, 60' of the side retention members 42A, 42A' is less than the first distance separating the base 26 from the terminal end 58, 58' of the front and back retention members 40, 40'. Said differently, the first distance is typically greater than the second distance, as each are defined above. For panels 22 having a thickness less than the second distance, the terminal ends 60, 60' prevent withdrawal of the flush mount retainer assembly 20 from the panel opening 24. In the illustrated embodiment, the side retention members 42A, 42A' each extend from the horizontal portion 38 of the front support member 32. The front support member 32 includes a pair of front support legs 62 in spaced relation to each other, with the front retention member 40 disposed therebetween. Similarly, the back support member 34 includes a pair of back support legs 64 in spaced relation to each other, with the back retention member 40' disposed therebetween. As described above, both horizontal portions 38, 38' at least partially overlap the threaded bore 28.

Figure 8A:
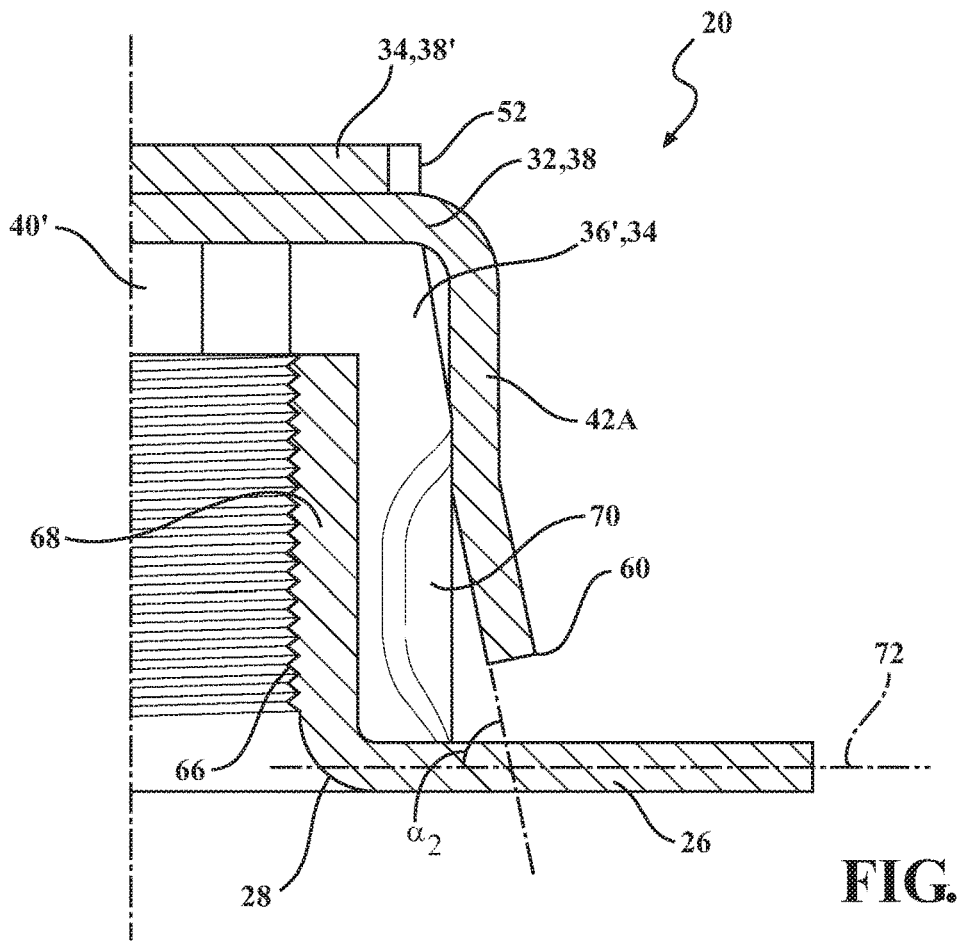
FIG. 8 shows partial side cross-sectional views of the angles formed by the first- and second-side retention members (8A) and the front and back retention members (8B)
Figure 8B:
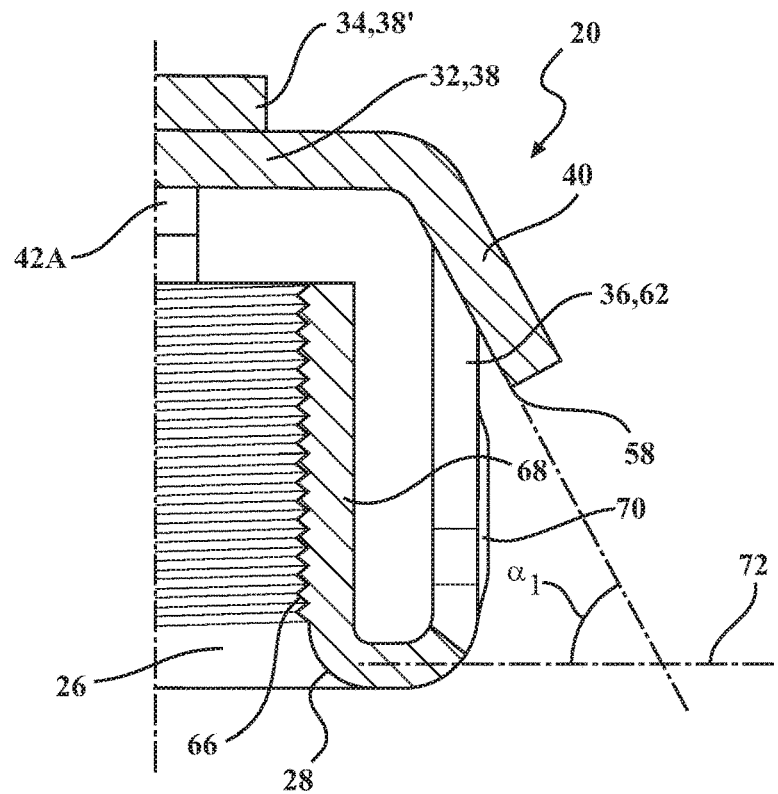

As illustrated in FIG. 8, the first and second-side retention members 42A, 42A' independently extend at angles $\alpha_2$ relative to the base 26. The angles $\alpha_2$ are larger than angles $\alpha_1$, which are angles at which the front and back retention members 40, 40' extend relative to the base 26. For purposes of determining the angles $\alpha_1$ and $\alpha_2$ formed with respect to the base 26, the angles are measured with respect to a plane 72 through which the base 26 extends. When compressed, the side retention members 42A, 42A' provide a spring force (in the lateral direction) that is greater than a corresponding spring force (in the lateral direction) provided by the front and back retention members 40, 40' (e.g. when compressed). The side retention members 42A, 42A' establish an interference fit within the panel opening 24 prior to the fastener 30 engaging the threaded bore 28, thereby substantially preventing play between the flush mount retainer assembly 20 and the panel 22.

Figure 6:
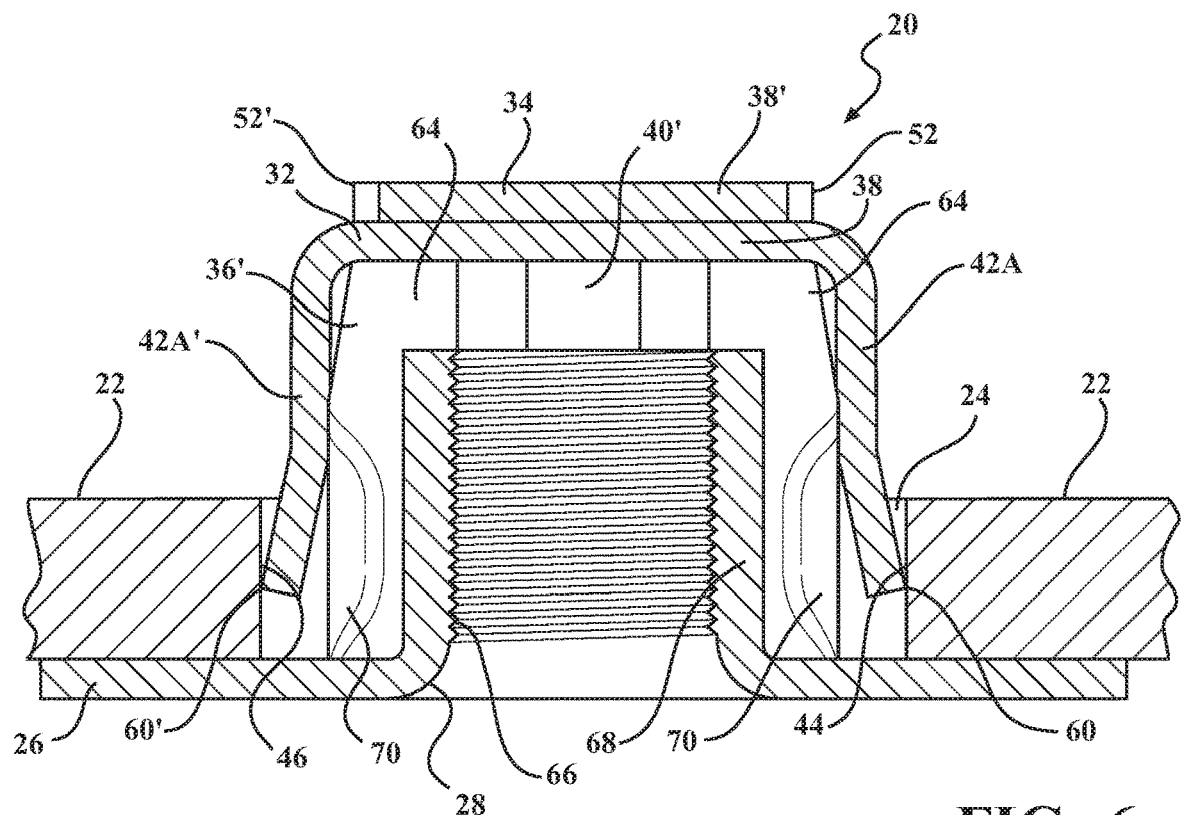
FIG. 6 is a cross-sectional view of the flush mount retainer assembly of FIG. 1 received within a panel opening prior to being engaged by a fastener.

As noted above, the flush mount retainer assembly 20 includes the cylinder 68, which extends orthogonally from the base 26 and defines the threaded bore 28. As shown in FIG. 6-8, the threaded bore 28 extends entirely through both the base 26 and the cylinder 68, and includes threads 66. The base 26 typically includes one or more barbs 70, which are positioned adjacent edges (e.g. the first and second edges 44, 46) of the panel opening 24 when the flush mount retainer assembly 20 is seated in the panel opening 24 (e.g. once the flush mount retainer assembly 20 is inserted into the panel opening 24). More particularly, the barbs 70 are positioned between outward faces 76 and outward vertical portions 50, 50', 54, between the base 26 and the outward horizontal edges 48, 48', 52, 52' of the front and back support members 32, 34. The barbs 70 are configured to abut and/or penetrate at least a portion of the panel 22 as the fastener 30 is engaged with (e.g. driven through) the bore 28 and against the overlapping regions of the front and back support members 32, 34, thereby further securing the flush mount retainer assembly 20 to the panel 22. Typically, the fastener 30 is disposed through the component 74 (e.g. via a through-hole) to be secured to the panel 22, such that a head 78 of the fastener 30 secures the component to the flush mount retainer assembly 20, which in turn is secured to the panel 22.

Figure 9:
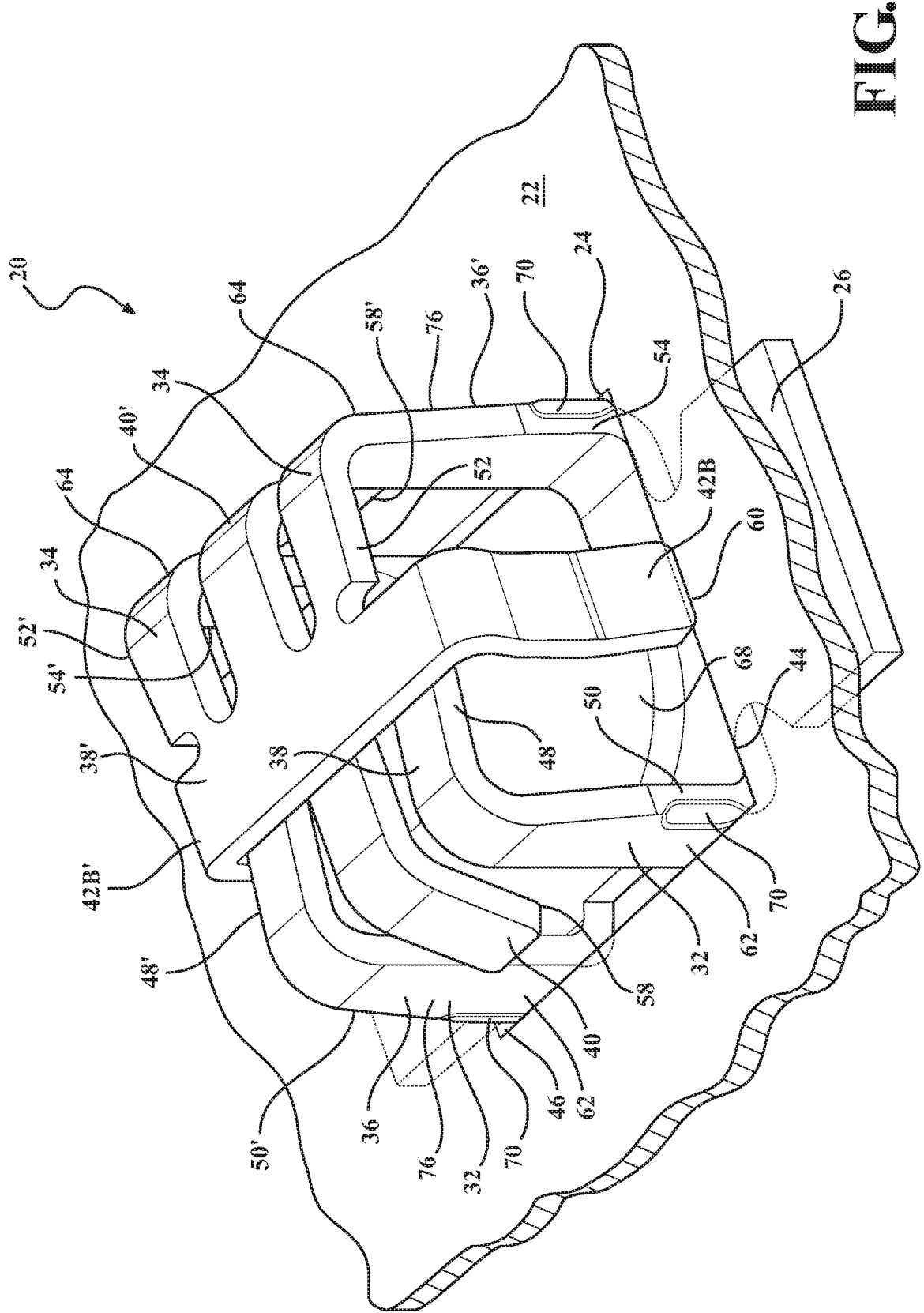
FIG. 9 is a perspective view of a flush mount retainer assembly in accordance with a second embodiment of the present disclosure received within a panel opening defined by a panel.

Referring now to FIG. 9, a flush mount retainer assembly 20 in accordance with a second embodiment of the present disclosure is illustrated. The flush mount retainer assembly 20 of FIG. 9 is structurally and functionally similar to the flush mount retainer assembly of FIGS. 1-8, except that the side retention members 42B, 42B' extend from the horizontal portion 38' of the back support member 34, rather than from the horizontal portion 38 of the front support member 32. The side retention members 42B, 42B' are resiliently flexible, such that they deflect inwardly to provide an interference fit within the panel opening 24. In particular, the side retention members 42B, 42B' provide an interference fit for panel openings 24 having a depth greater than the second distance separating the base 26 from the terminal ends 60, 60' of the side retention members 42B, 42B'. For panel openings having a depth less than the second distance, the terminal ends 60, 60' of the side retention members 42B, 42B' extend over the panel 22 and prevent withdrawal of a seated flush mount retainer assembly 20 from the panel opening 24.

Figure 10:
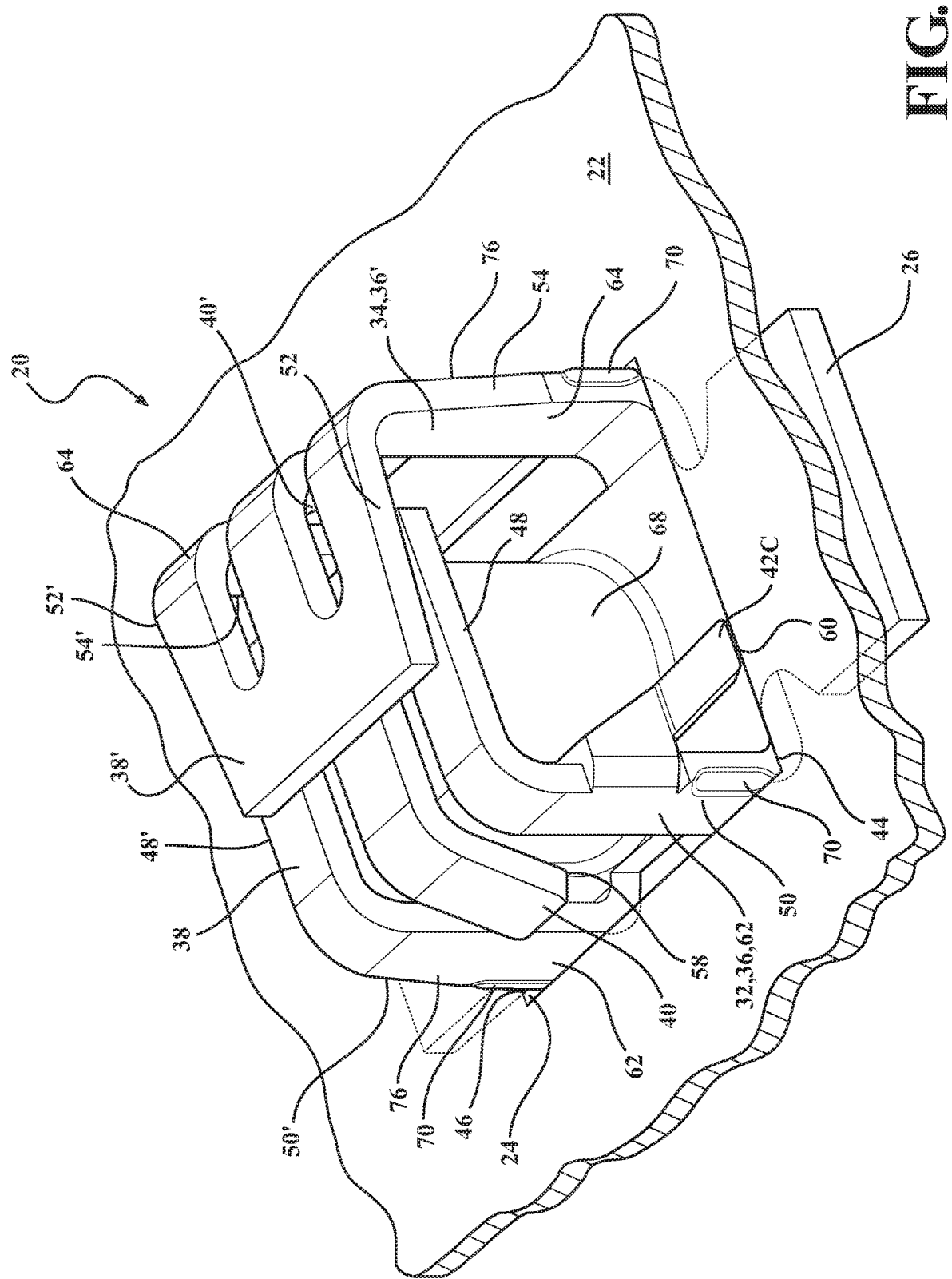
FIG. 10 is a perspective view of a flush mount retainer assembly in accordance with a third embodiment of the present disclosure received within a panel opening defined by a panel.

Referring now to FIG. 10, a flush mount retainer assembly 20 in accordance with a third embodiment of the present disclosure is illustrated. The flush mount retainer assembly 20 of FIG. 10 is structurally and functionally similar to the flush mount retainer assembly of FIGS. 1-8, except that the side retention members 42C, 42C' not shown) extend from the vertical portion 36 (rather than from the horizontal portion 38) of the front support member 32. More specifically, the side retention members 42C, 42C' extend from the vertical portion 36 of the front support member 32 at an angle relative to the base 26, while also projecting laterally outwardly to extend over the panel 22. The side retention members 42C, 42C' are resiliently flexible, such that they deflect inwardly to provide an interference fit within panel openings 24 having a depth greater than the second distance separating the base 26 from the terminal ends 60, 60'(not shown) of the side retention members 42C, 42C'. For panel openings 24 having a depth less than the second distance, the terminal ends 60, 60' of the side retention members 42C, 42C' extend over the panel 22 and prevent withdrawal of a seated flush mount retainer assembly 20 from the panel opening 24.

Figure 11:
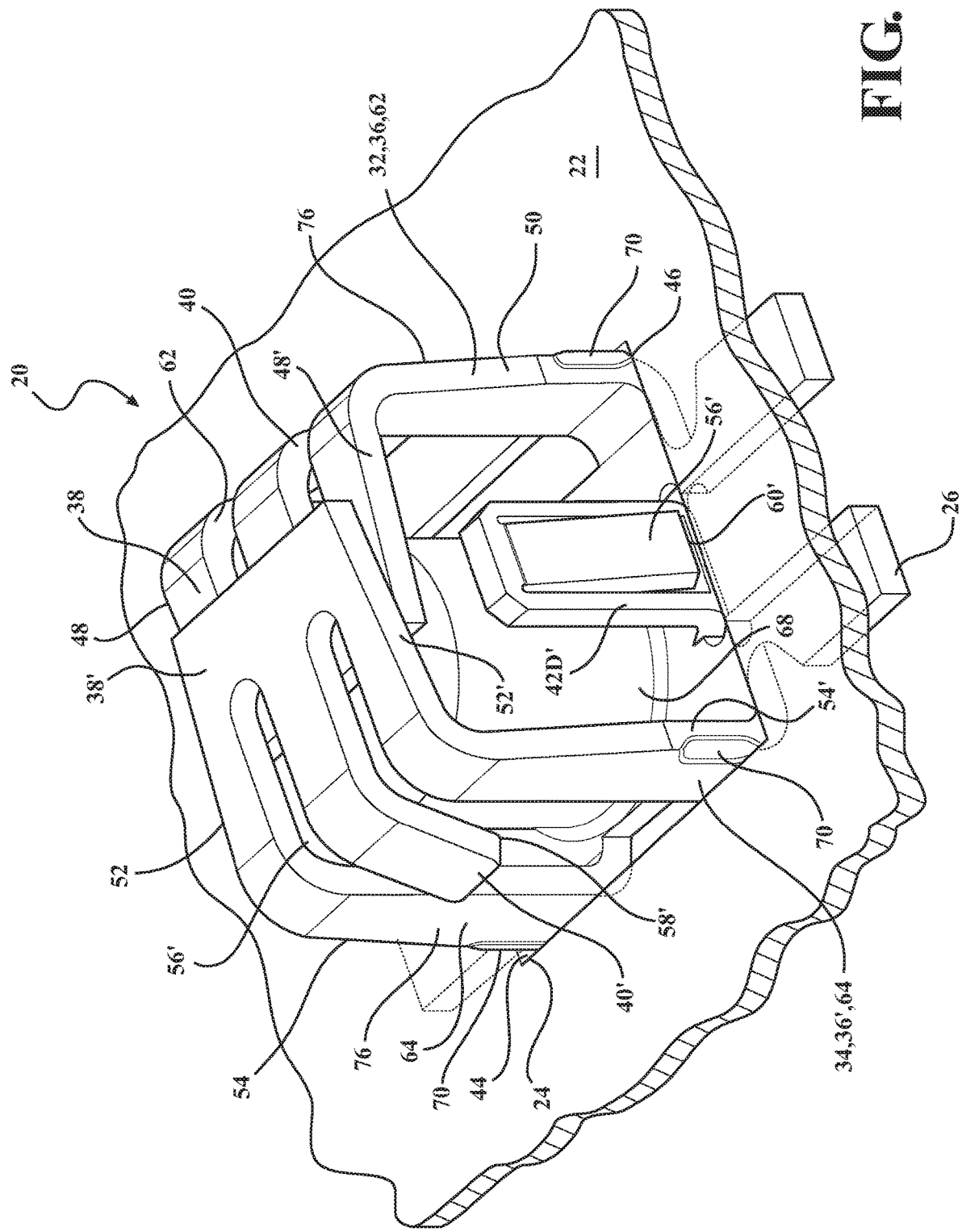
FIG. 11 is a perspective view of a flush mount retainer assembly in accordance with a fourth embodiment of the present disclosure received within a panel opening defined by a panel.

Referring now to FIG. 11, a flush mount retainer assembly 20 in accordance with a fourth embodiment of the present disclosure is illustrated. The flush mount retainer assembly 20 of FIG. 11 is structurally and functionally similar to the flush mount retainer assembly of FIGS. 1-8, except that the side retention members 42D (not shown), 42D' extend upwardly from the base 26, rather than downwardly from the front support member 32. The side retention members 42D, 42D' include ramped projections 56 (not shown), 56' to facilitate insertion of the flush mount retainer assembly 20 in the panel opening 24. The side retention members 42D are resiliently flexible, such that they deflect inwardly to provide an interference fit within panel openings having a depth greater than the second distance separating the base 26 from the lowermost portion 60 (not shown), 60' of the ramped projections 56, 56' of the side retention members 42D, 42D'.

The side retention members 42D, 42D' are versatile and can function with panels 22 having a variety of different thicknesses, and thus defining panel openings 24 of varying depths. For panel openings 24 having a depth less than the second distance, the lowermost portion 60, 60' of the ramped projections 56, 56' extend over the panel 22 and prevent withdrawal of a seated flush mount retainer assembly 20 from the panel opening 24, and further function to minimize slop of the flush mount retainer assembly 20 prior to the fastener 30 being engaged with (e.g. driven through) the threaded bore 28.

As will be understood from the description herein, the flush mount retainer assembly 20 is suitable for use in securing the component 74 to the panel 22 having the panel opening 24. In this regard, the term "flush" may refer to a general or specific orientation and proximity of the base 26 of the flush mount retainer assembly 20 as compared to a surface of the panel 22 (e.g., whether partially or fully adjacent to one another). In this sense, it is to be understood that the term "flush" may be used in either a descriptive or functional manner. As such, it is to be understood that the flush mount retainer assembly 20 may be disposed (i.e., inserted) only partially into the panel opening 24 of the panel 22 such that a bottom surface of the base 26 is not co-planar with a bottom surface of the panel 22 (such as shown in FIGS. 1, 5-7, and 9-11). Additionally, the flush mount retainer assembly 20 may be disposed (i.e., inserted) completely into the panel opening 24 of the panel 22 such that the bottom surface of the base 26 is coplanar with the surface of the panel 22 (e.g., when the panel opening is sized to accept the base 26 of the flush mount retainer assembly 20).

The various elements of the flush mount retainer assembly 20, as described above, may be manufactured of the same material, different materials, or different alloys or mixes of materials. Moreover, each element may itself comprise a combination of different materials and not necessarily have a homogeneous composition throughout. In the currently exemplified embodiments, the various elements of the flush mount retainer assembly 20 are manufactured of a material suitable to achieve the physical properties and performance demanded by the intended use and function of each element. Further, the entirety of the flush mount retainer assembly 20 can be manufactured of the same plastic or metal material, for example steel. However, myriad materials may be used to manufacture the elements of the flush mount retainer assembly 20, typically a function of at least availability, cost, and performance/end use application, and plastics and metals are not exhaustive of suitable materials that may be used.

As used herein, the term "vertical" is used in the general sense and not the absolute sense and, therefore, includes a range of relative geometric configurations between two elements that may reasonably be understood as "vertical" and is not meant to necessarily imply orthogonality. Likewise, the term "horizontal" similarly encompasses a range of relative geometric configurations between elements and does not necessarily imply parallelity or orthogonality in an absolute sense but, rather, encompasses a range of relative geometrical orientations reasonably understood as falling within the general category of horizontality.

The above description is that of current embodiments of the disclosure. Various alterations and changes can be made without departing from the spirit and broader aspects of the disclosure as defined in the appended claims, which are to be interpreted in accordance with the principles of patent law including the doctrine of equivalents. This disclosure is presented for illustrative purposes and should not be interpreted as an exhaustive description of all embodiments of the disclosure or to limit the scope of the claims to the specific elements illustrated or described in connection with these embodiments. Any reference to elements in the singular, for example, using the articles "a," "an," "the," or "said," is not to be construed as limiting the element to the singular.

The invention claimed is:

1. A flush mount retainer assembly comprising:
   a base;
   a cylinder extending from the base and defining a threaded bore;
   a support member extending from the base and including a horizontal portion overlying the threaded bore, the support member further including a front retention member disposed at a front side thereof and a back retention member disposed at a back side thereof, the front retention member and the back retention member being spaced apart from the base by a first distance; and
   a first-side retention member and a second-side retention member disposed at opposing lateral sides of the flush mount retainer assembly, the first-side retention member and the second-side retention member being adapted to stabilize the flush mount retainer assembly within panel openings having a depth less than the first distance;
   wherein the first-side retention member and the second-side retention member extend to a first terminal end and a second terminal end, respectively, that slope outwardly relative to the cylinder.

2. The flush mount retainer assembly of claim 1 wherein the first-side retention member and the second-side retention member include an angled portion that slopes outwardly toward the base.

3. The flush mount retainer assembly of claim 1 wherein the first-side retention member and the second-side retention member are joined to the horizontal portion of the support member.

4. The flush mount retainer assembly of claim 1 wherein the first-side retention member and the second-side retention member are joined to a vertical portion of the support member.

5. The flush mount retainer assembly of claim 1 wherein the first-side retention member and the second-side retention member are joined to the base and extend vertically therefrom.

6. The flush mount retainer assembly of claim 1 wherein the first-side retention member and the second-side retention member are resiliently flexible to a lesser extent than the front retention member and the back retention member.

7. The flush mount retainer assembly of claim 1 wherein the first-side retention member and the second-side retention member are disposed at opposing lateral sides of the cylinder.

8. The flush mount retainer assembly of claim 1 wherein the opposing lateral sides of the flush mount retainer assembly are generally perpendicular to the front side of the flush mount retainer assembly and the back side of the flush mount retainer assembly.

9. A flush mount retainer assembly adapted to be received within a panel opening, the flush mount retainer assembly comprising:
   a base defining a bore for receiving a fastener;
   a front support member and a back support member, the front support member and the back support member each including a vertical portion connected to the base and a horizontal portion extending from the vertical portion and at least partially overlying the bore, wherein the front and back support members are resiliently flexible outwardly in response to the bore being engaged by the fastener;
   a front retention member extending from the front support member and a back retention member extending from the back support member to limit movement of the flush mount retainer assembly relative to the panel prior to the bore being engaged by the fastener;
   a first-side retention member disposed between the vertical portion of the front support member and the vertical portion of the back support member to establish an interference fit with a first edge of the panel opening; and
   a second-side retention member disposed between the vertical portion of the front support member and the vertical portion of the back support member to establish an interference fit with a second edge of the panel opening opposite the first edge of the panel opening.

10. The flush mount retainer assembly of claim 9 wherein the first-side retention member and the second-side retention member each extend from an outward edge of the horizontal portion of the front support member.

11. The flush mount retainer assembly of claim 9 wherein the first-side retention member and the second-side retention member each extend from an outward edge of the vertical portion of the front support member.

12. The flush mount retainer assembly of claim 9 wherein the first-side retention member and the second-side retention member each extend from an outward edge of the horizontal portion of the back support member.

13. The flush mount retainer assembly of claim 9 wherein the first-side retention member and the second-side retention member each extend from an outward edge of the vertical portion of the back support member.

14. The flush mount retainer assembly of claim 9 wherein the first-side retention member and the second-side retention member each extend from the base of the flush mount retainer assembly.

15. The flush mount retainer assembly of claim 9 wherein the first-side retention member and the second-side retention member each establish an interference fit with the panel at a point more proximal to the base than a point at which the front and back retention members terminate.

16. The flush mount retainer assembly of claim 9 wherein a front support member includes a pair of front support legs in spaced relationship with one another and the back support member includes a pair of back support legs in spaced relationship with one another.

17. A flush mount retainer assembly comprising:
a base;
a cylinder connected to the base and defining a threaded bore extending therethrough;
a front support member connected to the base and including a horizontal portion, a vertical portion, and a front retention member;
a back support member connected to the base and including a horizontal portion, a vertical portion, and a back retention member; and
a first-side retention member and a second-side retention member disposed at opposing lateral sides of the flush mount retainer assembly,
wherein the front retention member, the back retention member, the first-side retention member, and the second-side retention member include a ramped surface that angles outwardly relative to the base at each of four sides of the flush mount retainer assembly, and wherein the ramped surface of the first-side and second-side retention members are more proximal to the base than are the ramped surfaces of the front and back retention members, such that retainer assembly can be securely received within panel openings having varying depths;
wherein the first-side retention member and the second-side retention member extend to a first terminal end and a second terminal end, respectively, that slope outwardly relative to the cylinder.

18. The flush mount retainer assembly of claim 17 wherein the first-side retention member and the second-side retention member are connected to the front support member.

19. The flush mount retainer assembly of claim 17 wherein the first-side retention member and the second-side retention member are connected to the back support member.

20. The flush mount retainer assembly of claim 17 wherein the first-side retention member and the second-side retention member are connected to the base and extend vertically therefrom.

\* \* \* \* \*